(12) United States Patent
Sano

(10) Patent No.: US 10,802,417 B2
(45) Date of Patent: Oct. 13, 2020

(54) OPTICAL SCANNING APPARATUS AND IMAGE FORMING APPARATUS

(71) Applicant: CANON KABUSHIKI KAISHA, Tokyo (JP)

(72) Inventor: Atsushi Sano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/410,931

(22) Filed: May 13, 2019

(65) Prior Publication Data

US 2019/0361367 A1 Nov. 28, 2019

(30) Foreign Application Priority Data

May 23, 2018 (JP) ................................. 2018-098663

(51) Int. Cl.
| | | |
|---|---|---|
| *G03G 15/04* | (2006.01) | |
| *G03G 15/043* | (2006.01) | |
| *G02B 26/12* | (2006.01) | |
| *G03G 21/16* | (2006.01) | |

(52) U.S. Cl.
CPC ......... *G03G 15/0435* (2013.01); *G02B 26/12* (2013.01); *G03G 15/04072* (2013.01); *G03G 21/1666* (2013.01)

(58) Field of Classification Search
CPC ....... G03G 15/04036; G03G 15/04072; G03G 15/0435; G03G 21/1666; G02B 26/10; G02B 26/12

See application file for complete search history.

(56) References Cited

U.S. PATENT DOCUMENTS

| | | | |
|---|---|---|---|
| 7,508,859 B2 | 3/2009 | Azami et al. | ................. 372/101 |
| 7,663,656 B2 * | 2/2010 | Yamazaki | ................ B41J 2/473 |
| | | | 347/242 |
| 2003/0058513 A1 | 3/2003 | Yoshizawa | ................. 359/204.1 |
| 2007/0273748 A1 | 11/2007 | Mamiya | ........................ 347/261 |

(Continued)

FOREIGN PATENT DOCUMENTS

| | | |
|---|---|---|
| JP | 2003-205649 | 7/2003 |
| JP | 2006126647 A * | 5/2006 |

(Continued)

OTHER PUBLICATIONS

Extended European Search Report dated Oct. 31, 2019 in counterpart EP Application 19174562.9.

*Primary Examiner* — Sophia S Chen

(74) *Attorney, Agent, or Firm* — Venable LLP

(57) ABSTRACT

An optical scanning apparatus includes an optical scanning unit which includes a first light source, a first rotatable polygonal mirror for reflecting the beam emitted from the first light source, a second light source, a second rotatable polygonal mirror for reflecting the beam emitted from the second light source; and a housing accommodating the polygonal mirrors. The housing includes only three fixed portions fixed to a fixing portion for fixing the optical scanning unit. The first rotatable polygonal mirror and the second rotatable polygonal mirror are disposed such that a rotational axis of the first rotatable polygonal mirror and a rotational axis of the second rotatable polygonal mirror are in a triangular area defined by lines connecting the three fixed portions, as viewed in a rotation axial direction of the first rotatable polygonal mirror.

16 Claims, 10 Drawing Sheets

(56) References Cited

U.S. PATENT DOCUMENTS

| | | | |
|---|---|---|---|
| 2008/0181668 A1* | 7/2008 | Ohnishi | G03G 15/04036 |
| | | | 399/221 |
| 2009/0003881 A1* | 1/2009 | Tahk | G02B 26/12 |
| | | | 399/218 |
| 2012/0002260 A1 | 1/2012 | Tomioka | 359/201.1 |
| 2012/0263501 A1* | 10/2012 | Tsuchiya | G03G 21/1666 |
| | | | 399/177 |
| 2013/0293659 A1* | 11/2013 | Suzuki | G03G 15/04072 |
| | | | 347/118 |

FOREIGN PATENT DOCUMENTS

| | | |
|---|---|---|
| JP | 2007-034166 | 2/2007 |
| JP | 2007-034167 | 2/2007 |
| JP | 2007-316446 | 12/2007 |
| JP | 2008-058353 | 3/2008 |
| JP | 2016-151720 | 8/2016 |

\* cited by examiner (COMPARATIVE EXAMPLE)

OPTICAL SCANNING APPARATUS AND IMAGE FORMING APPARATUS

FIELD OF THE INVENTION AND RELATED ART

The present invention relates to an optical scanning apparatus for scanning the surface of an object to be scanned, by deflecting the beam of light it emits from its light source(s). It relates also to an image forming apparatus such as an electrophotographic copying machine, an electrophotographic printer, etc., which is equipped with the optical scanning apparatus.

An optical scanning apparatus which is used by an image forming apparatus such as a printer or a copying machine emits a beam of light from its light source(s) while modulating the beam with image formation signals, deflects the beam with its optical deflecting means such as an rotational polygonal mirror, and focuses the beam on the peripheral surface of a photosensitive drum with its optical focusing system in a manner to form a spot of light on the peripheral surface of the photosensitive drum. The rotational polygonal mirror is being rotated. Therefore, the spot of light formed on the peripheral surface of the photosensitive drum by the focused beam of light moves relative to the peripheral surface of the photosensitive drum in the direction parallel to the rotational axis of the photosensitive drum (primary scan). Further, the photosensitive drum is being rotated. Therefore, the spot of light moves relative to the peripheral surface of the photosensitive drum in the direction parallel to the rotational direction of the drum (secondary scan). Consequently, an electrostatic image is formed on the peripheral surface of the photosensitive drum. This latent image is developed into a visible image. That is, an image which is in accordance with the image formation signal is recorded.

In a case where an optical scanning apparatus such as the one described above is employed by a color image forming apparatus, four images which are different in color, more specifically, yellow (Y), magenta (M), cyan (C) and black (K) images are layered upon a sheet of recording medium to form a color image. Generally speaking, an optical deflecting device and an optical focusing system, which were described above, are placed in a housing. Thus, if the housing reduces in rigidity, it sometimes has ill effects upon the accuracy with which an image is formed, because if the housing reduces in rigidity, the beam of light for scanning is made to miss preset points on the peripheral surface of the drum, by the vibrations of the deflecting device, which occur as the rotational polygonal mirror of the deflecting device is rotated at a high rate of speed.

There is disclosed in Japanese Laid-open Patent Application No. 2007-34166, an optical scanning device which employs a pair of deflecting devices, and a pair of optical scanning systems. In the case of this optical scanning apparatus, in order to increase its housing in rigidity, each of the corner portions of the housing is provided with an appendage, by which the housing is fixed to the frame of the image forming apparatus, with the use of small screws.

In the case of the optical scanning apparatus disclosed in Japanese Laid-open Patent Application No. 2003-205649, it is provided with multiple (two) optical scanning apparatuses, which are held side by side to the frame of the image forming apparatus in terms of the direction perpendicular to its height direction, and are positioned relative to the frame of the image forming apparatus by being pressed upon the positioning portions of the frame by the pressing means which supporting members have. Therefore, this optical scanning apparatus is substantially smaller in the amount by which the housing is made to deform by the fixation of the optical scanning apparatus to the frame with the use of small screws, and therefore, is substantially smaller in the amount of image defects such as color deviation, than those which proceeded this one.

In recent years, however, demand has been increasing for a smaller image forming apparatus. Thus, in consideration of a case in which an image forming apparatus is structured so that its image reading portion is a top portion of the apparatus, it is desired to reduce an image forming apparatus in overall height.

In order to reduce an image forming apparatus in overall height, its optical scanning apparatus also has be reduced in height. As a means to reduce an optical scanning apparatus in height (thickness), it is effective to structure an optical scanning apparatus as disclosed in Japanese Laid-open Patent Application No. 2007-34166. That is, it is effective to employ two deflecting devices, and structure the apparatus so that beams of laser light do not need to be guided without stacking the optical components such as return mirrors in the height direction of the apparatus.

On the other hand, in the case of an optical scanning apparatus having only one deflecting device, in order to make the four beams of laser light equal in the distance which they have to travel to the corresponding photosensitive drums, the return mirrors are stacked in the height direction of the housing. In this case, therefore, the housing increases in rigidity. However, the optical scanning apparatus structured as disclosed in Japanese Laid-open Patent Application No. 2007-34166 has two deflecting devices, which are the sources of vibrations, and also, its housing has to be reduced in height (thickness) to reduce the optical scanning apparatus in height. Thus, it is lower in rigidity, being therefore more susceptible to vibrations, compared to the one having only one deflecting device described above.

On the other hand, fixing the housing to the frame at multiple points, with the use of small screws, can reduce the optical scanning apparatus in the amount of vibrations, but it may sometimes cause the housing to deform, because as the small screws are tightened, the portions of the housing, which are adjacent to the screws, might follow the rotational movement of the screws. In addition, using small screws to fix the housing to the frame of an image forming apparatus can reduce the optical scanning apparatus in the amount of vibrations, but it sometimes causes the housing to deform as the optical scanning apparatus goes through thermal expansion. That is, using small screws to fix the housing to the frame of an image forming apparatus sometimes causes the housing to deform. This housing deformation causes an image forming apparatus to output inferior images such as images which suffer color deviation or the like.

SUMMARY OF THE INVENTION

Thus, the primary object of the present invention is to provide an optical scanning apparatus which is substantially less in vibrations, and therefore, is substantially less in the amount by which the beam of light emitted by its light source deviates from the intended point due to the vibrations of the deflecting device, than any conventional optical scanning device.

According to an aspect of the present invention, there is provided an optical scanning apparatus comprising an optical scanning unit, including a first light source configured to emit a beam modulated in accordance with image information, a first deflection unit configured to deflect the beam emitted from said first light source, said first deflection unit including a first rotatable polygonal mirror configured to reflect the beam emitted from said first light source, a second light source configured to emit a beam modulated in accordance with image information, a second deflection unit configured to deflect the beam emitted from said second light source, said second deflection unit includes a second rotatable polygonal mirror configured to reflect the beam emitted from said second light source; and a housing accommodating said first deflection unit and said second deflection unit, said housing includes only three fixed portions fixed to a fixing portion configured to fix said optical scanning unit; wherein said first rotatable polygonal mirror and said second rotatable polygonal mirror are disposed such that a rotational axis of said first rotatable polygonal mirror and a rotational axis of said second rotatable polygonal mirror are in a triangular area defined by lines connecting the three fixed portions, as viewed in an rotation axial direction of said first rotatable polygonal mirror.

Further features of the present invention will become apparent from the following description of exemplary embodiments with reference to the attached drawings.

DESCRIPTION OF THE EMBODIMENTS

Embodiment 1

(Image forming apparatus)

Figure 1:
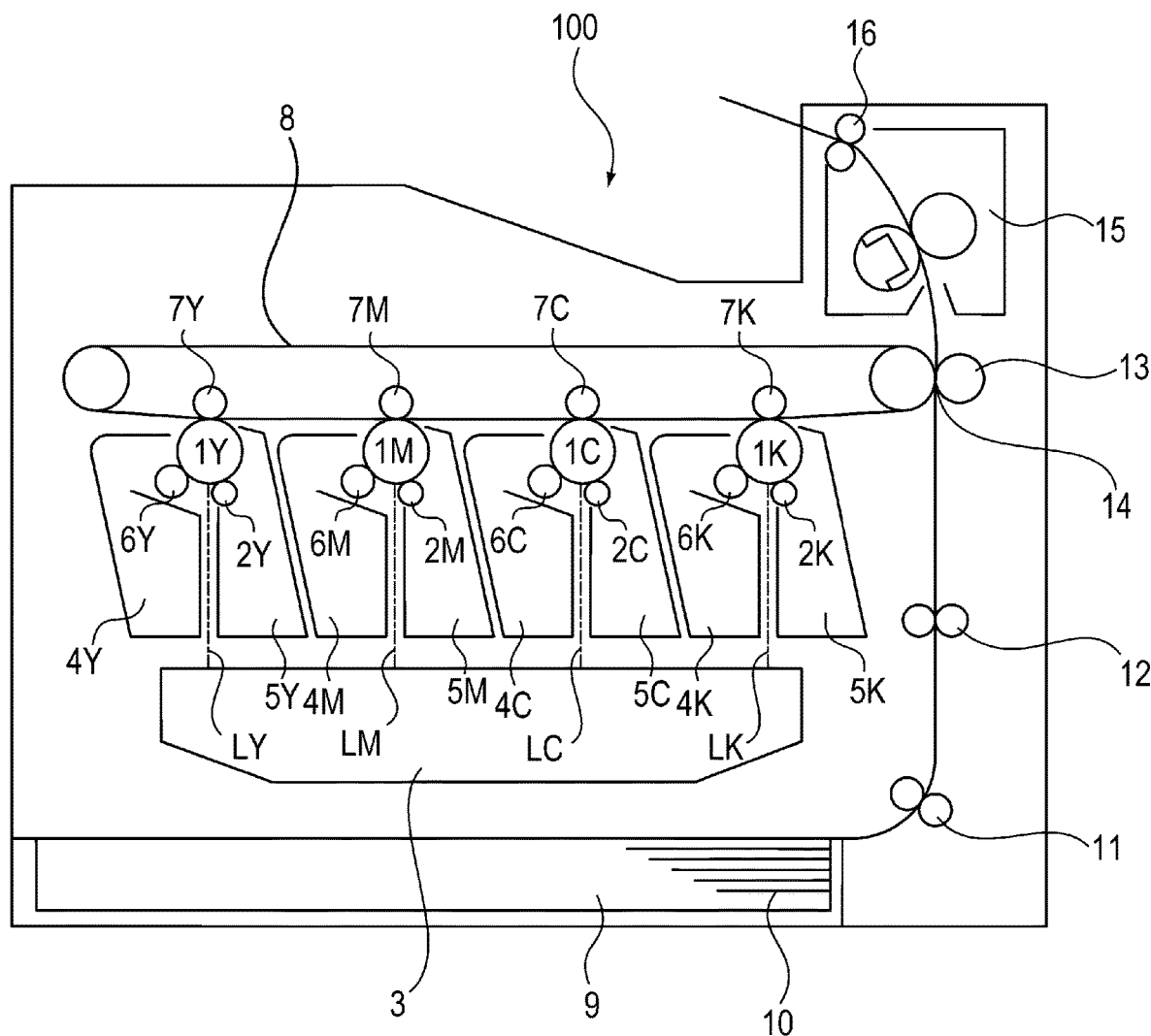
FIG. 1 is a schematic sectional view of an image forming apparatus having an optical scanning apparatus.

To begin with, referring to FIGS. 1-11, an image forming apparatus in this embodiment, which contains an optical scanning apparatus which is in accordance with the present invention, is described. First, referring to FIG. 1, the image forming apparatus is described. Then, referring to FIGS. 2-4, the optical scanning apparatus in this embodiment is described. FIG. 1 is a schematic sectional view of the image forming apparatus 100 which contains the optical scanning apparatus 3 in this embodiment; it is for describing the structure of the image forming apparatus 100.

The image forming apparatus 100 shown in FIG. 1 is an electrophotographic color image forming apparatus for forming a toner image on a sheet 10 of recording medium such as paper. It is provided with yellow (Y), magenta (M), cyan (C) and black (K) toners.

Referring to FIG. 1, photosensitive drums 1Y (first photosensitive members), 1M (third photosensitive member), 1C (second photosensitive member), and 1K (fourth photosensitive member), which are image bearing members, are uniformly charged in charging units 5Y, 5M, 5C and 5K by charge rollers 2Y, 2M, 2C and 2K, respectively, as charging means. The peripheral surface of each of the charged photosensitive drums is scanned by a beam of laser light LY, LM, LC or LK emitted by the optical scanning apparatus 3 as an exposing means, while being modulated by the image data provided by an unshown image data input portion. Consequently, an electrostatic latent image is formed on the uniformly charged peripheral surface of the photosensitive drum 1.

The electrostatic latent image formed on the peripheral surface of each of the photosensitive drums 1Y, 1M, 1C and 1K is supplied with yellow (Y), magenta (M), cyan (C) and black (K) toners by development rollers 6Y, 6M, 6C and 6K in developing apparatuses 4Y, 4M, 4C and 4K, respectively, as developing means. As a result, the electrostatic latent image is developed into a toner image. That is, yellow (Y), magenta (M), cyan (C) and black (K) toner images are formed on the peripheral surfaces of the photosensitive drums 1Y, 1M, 1C and 1K, respectively.

The image forming apparatus 100 is provided with an intermediary transfer belt 8, which is suspended and tensioned in such a manner that it opposes the photosensitive drums 1Y, 1M, 1C and 1K. The yellow (Y), magenta (M), cyan (C) and black (K) toner images formed on the peripheral surfaces of the photosensitive drums 1Y, 1M, 1C and 1K, respectively, are sequentially transferred (primary transfer) onto the outward surface of the intermediary transfer belt 8, in terms of the loop (belt loop) which the intermediary transfer belt 8 forms, by the primary transfer bias voltage applied to primary transfer rollers 7Y, 7M, 7C and 7K, as the primary transferring means, which are disposed on the inward side of the belt loop.

In a sheet feeder cassette 9, a substantial number of sheets 10 of recording medium are stored in layers. The sheets 10 of recording medium stored in layers in the cassette 9 are fed into the main assembly of the image forming apparatus 100 by a feed roller 11, and then, are conveyed further into the main assembly by a pair of conveyance rollers 12.

Thereafter, each sheet 10 of recording medium such as paper is conveyed to the secondary transferring portion 14, which is the nip between the intermediary transfer belt 8 and a secondary transfer roller 13 as the secondary transferring means, by the pair of conveyance rollers 12, with preset timing. Then, the toner images on the outward surface of the intermediary transfer belt 8, in terms of the belt loop, are transferred (secondary transfer) onto the sheet 10 by the secondary transfer bias voltage applied to the secondary transfer roller 13.

Then, the sheet 10 of recording medium is sent to a fixing apparatus 15 as a fixing means, by the secondary transfer roller 13 of the secondary transferring portion 14, and the intermediary transfer belt 8, while remaining pinched between the roller 13 and belt 8. Then, the sheet 10 and the toner image thereon are heated and pressed by the fixing apparatus 15. Consequently, the toner images are fixed to the sheet 10. Then, the sheet 10 is conveyed by a pair of discharge rollers 16.

(Optical Scanning Apparatus)

Figure 2:
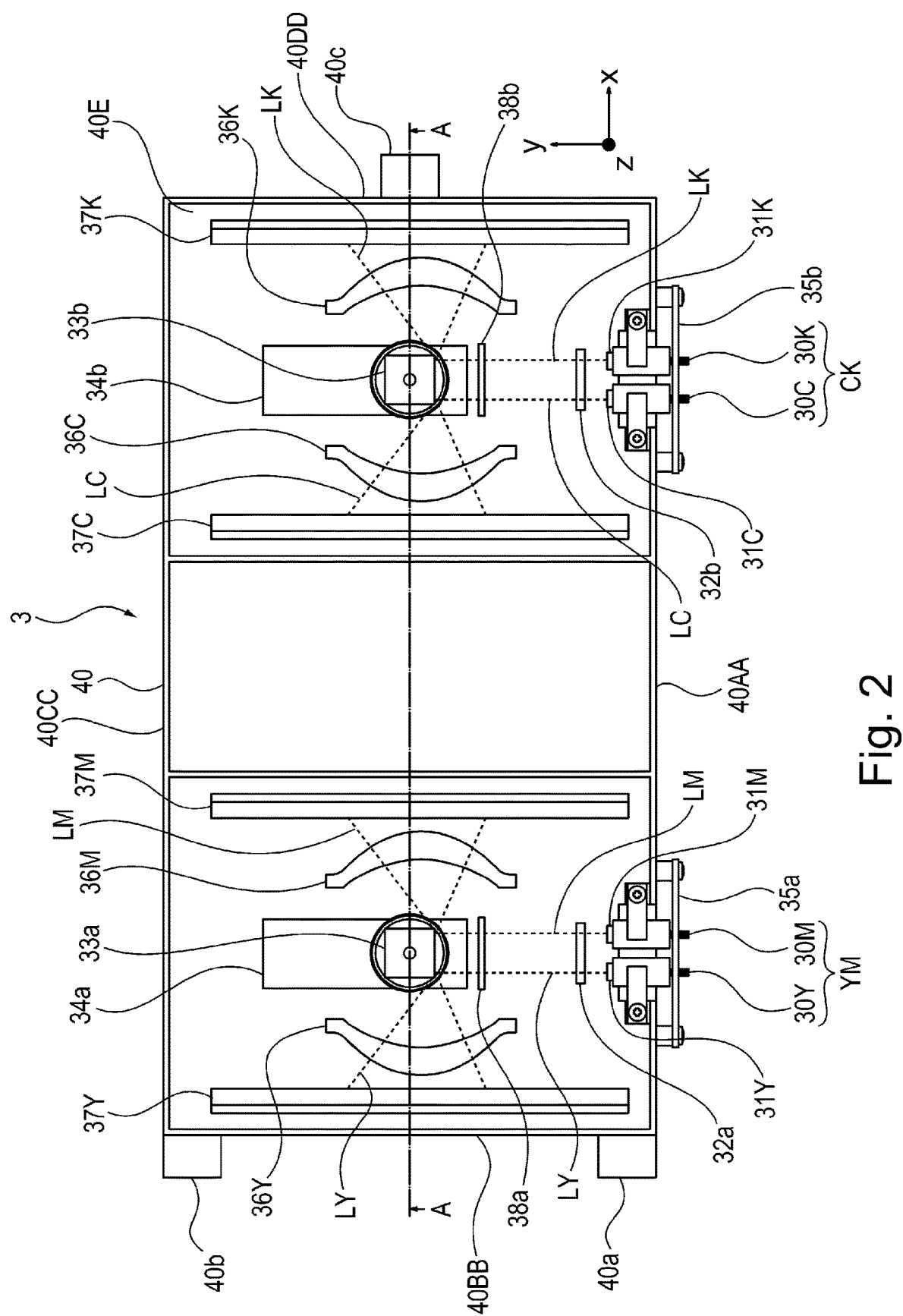
FIG. 2 is a top view of the optical scanning apparatus.
Figure 3:
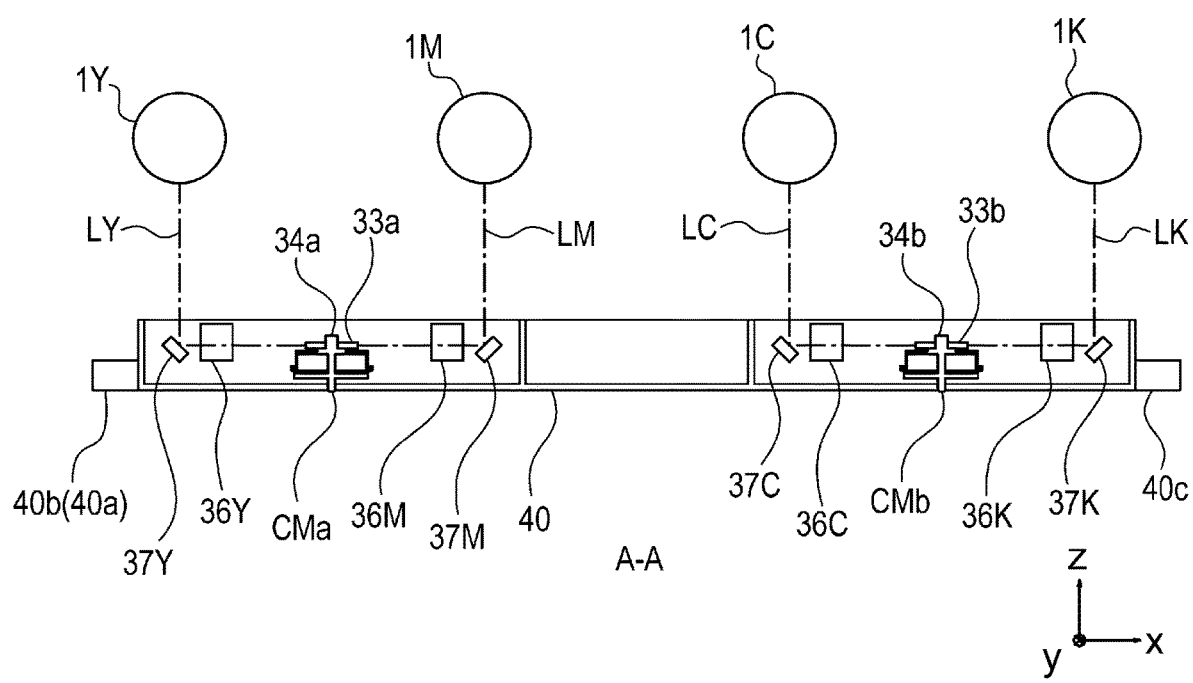
FIG. 3 is a sectional view of the optical scanning apparatus at a plane A-A in FIG. 2.
Figure 4:
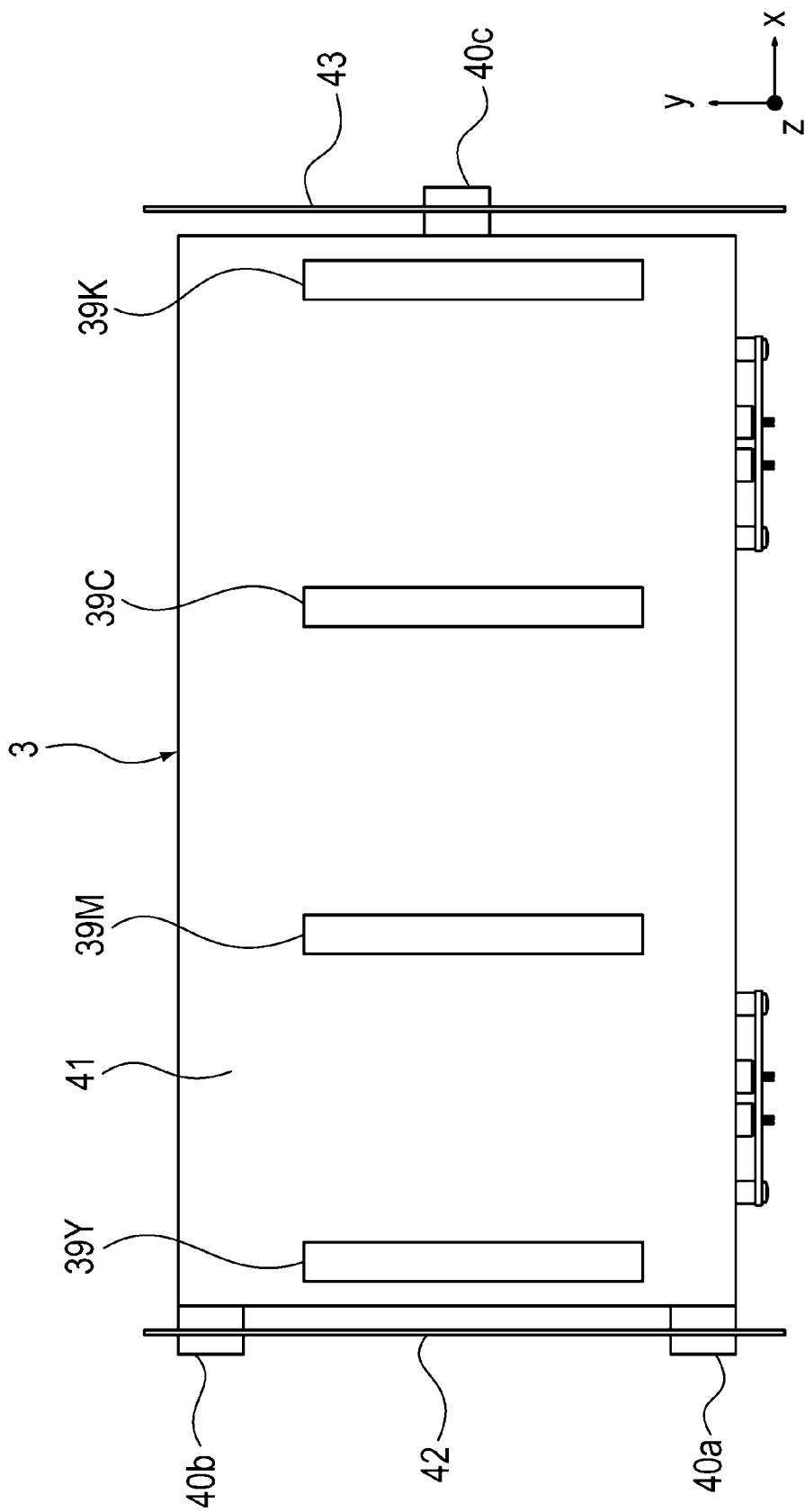
FIG. 4 is a top view of the optical scanning apparatus after the attachment of the optical scanning apparatus to the frame of the image forming apparatus.

Next, referring to FIGS. 2, 3 and 4, the optical scanning apparatus 3 is described about its overall structure. FIG. 2 is a top view of the optical scanning apparatus 3 in this embodiment, after the removal of the scanner cover 41 of the optical scanning apparatus 3. FIG. 3 is a sectional view of the optical scanning apparatus 3 at a plane A-A in FIG. 2. FIG. 4 is a top view of the optical scanning apparatus 3 with the scanner cover 41, after the attachment of the optical scanning apparatus 3 to the frames 42 and 43 of the image forming apparatus 100. In FIGS. 2, 3 and 4, the direction indicated by an arrow mark x is the direction in which the four photosensitive drums 1 are aligned in tandem. The direction indicated by an arrow mark y is the direction which is perpendicular to the direction indicated by the arrow mark x. It is such a direction that is parallel to the primary scan direction, that is, the direction in which the beam of laser light is moved by the rotation of the rotational polygonal mirror. The direction indicated by an arrow mark z is such a direction that is perpendicular to both the direction indicated by the arrow mark x and the direction indicated by the arrow mark y. It is parallel to the axial line of the rotational polygonal mirror.

Referring to FIGS. 2 and 3, the optical scanning apparatus 3 in this embodiment has: a housing 40; a scanner motor 34a of the first deflecting device; and a scanner motor 34b of the second deflecting device. Further, it has: the first light source unit YM, which has multiple (two) light sources; and the second light source unit CK, which has multiple (two) light sources.

The housing 40 has three attachment appendages 40a, 40b and 40c, by which it is held to the frames 42 and 43 of the image forming apparatus 100. Hereafter, these attachment appendages may be referred to simply as appendages. The housing 40 is made up of a bottom wall 40E, and four side walls 40AA, 40BB, 40CC and 40DD, which surround the bottom wall 40E. Its opening, which opposes the bottom wall 40E is covered with the scanner cover 41 (FIG.

The scanner motor 34a of the first deflecting device is attached to a rotational polygonal mirror 33a. It is held to the bottom wall of the housing 40 by its shaft CMa, the rotational axis of which coincides with the rotational axis of the rotational polygonal mirror 33a. The scanner motor 34b of the second deflecting device is attached to a different portion of the housing 40 from the portion of the housing 40, to which the scanner motor 34a is attached. The scanner motor 34b is attached to the bottom wall of the housing 40 by its shaft CMb, the rotational axis of which coincides with that of the rotational polygonal mirror 33b.

Among the aforementioned three attachment appendages 40a, 40b and 40c of the housing 40, the two attachment appendages 40a and 40b are held to the side wall 40BB of the housing 40. The attachment appendage 40c of the housing 40 is held to the side wall 40DD, which is the opposite wall of the housing 40 from the side wall 40BB. The side wall 40BB of the housing 40, which is provided with the attachment appendages 40a and 40b is on one side of a straight line CL (single-dot chain line in FIG. 6) which coincides with the rotational axis of the two shafts CMa and CMb. The other side wall 40DD of the housing 40, which is provided with the attachment appendage 40c, is on the other side of the straight line CL (single-dot chain line in FIG. 6).

The first light source unit YM has a pair of semiconductor lasers 30Y and 30M, as the first and third light sources for projecting beams LY and LM, respectively, of laser light upon the rotational polygonal mirror 33a attached to the scanner motor 34a. The semiconductor lasers 30Y and 30M are under the control of a laser driving circuit 35a. The second light source unit CK has a pair of semiconductor lasers 30C and 30K, as the second and fourth light sources, for projecting beams LC and LK, respectively, of laser light upon the rotational polygonal mirror 33b attached to the scanner motor 34b. The semiconductor lasers 30C and 30K are under the control of a laser driving circuit 35b. The first light source unit YM and second light source unit CK are attached to the side wall 40AA of the housing 40, being aligned in the direction in which the four photosensitive drums 1 are aligned in tandem.

Referring to FIGS. 2 and 3, in this embodiment, the optical scanning apparatus 3 is provided with four light sources which project four beams LY, LM, LC and LK upon the four photosensitive drums 1Y, 1M, 1C and 1K, respectively.

The beams LY, LM, LC and LK of laser light emitted from the semiconductor lasers 30Y, 30M, 30C and 30K, under the control of the laser driving circuits 35a and 35b are parallelized by collimator lenses 31Y, 31M, 31C and 31K, respectively. Then, the beams LY, LM, LC and LK of parallelized laser light are put through a pair of cylindrical lenses 32a and 32b, and a pair of apertures 38a and 38b, to make the beams converge only in the secondary scan direction. Thus, the beams LY, LM, LC and LK of laser light form linear images on the reflective surfaces of the rotational polygonal mirrors 33a and 33b attached to the scanner motors 34a and 34b as deflecting devices, respectively.

As the beams LY, LM, LC and LK of laser light are deflected by the rotational polygonal mirrors 33a and 33b, they transmit through scanning lenses 36Y, 36M, 36C and 36K, are reflected by mirrors 37Y, 37M, 37C and 37K, and are focused on the peripheral surfaces of the photosensitive drums 1Y, 1M, 1C and 1K, respectively.

The optical scanning apparatus 3 is structured so that a combination of the semiconductor laser 30Y, scanning lens 36Y, and return mirror 37Y, and a combination of the semiconductor lasers 30M, scanning lens 36M, and return mirror 37M are roughly symmetrically disposed, respectively, with reference to the scanner motor 34a, in the housing 40. Similarly, the optical scanning apparatus 3 is structured so that a combination of the semiconductor lasers 30C, scanning lens 36K, and return mirror 37Y, and a combination of the semiconductor laser 30K, scanning lens 36K, and return mirror 37K are roughly symmetrically disposed, respectively, with reference to the scanner motor 34b, in the housing 40.

Further, as described above, the scanner motors 34a and 34b are rotatably attached to the housing 40 by their shafts CMa and CMb. The rotational axis of the shafts CMa and CMb of the scanner motors 34a and 34b coincide with the rotational axes of the rotational polygonal mirrors 33a and 33b, respectively. Since the optical scanning apparatus 3 is structured so that the rotational shaft, with which the rotational polygonal mirror, is rotatably supported by a bearing sleeve fixed to the substrate, the bearing sleeve functions as the rotational shaft. This embodiment, however, is not intended to limit the present invention in scope in terms of the structure of the optical scanning apparatus 3. For example, the optical scanning apparatus 3 may be structured so that the bearing sleeve which rotates with the rotational polygonal mirror, is rotatably supported by a rotational shaft fixed to a substrate. In such a case, the rotational shaft is the rotational shaft portion.

Referring to FIG. 4, the housing 40 in which the aforementioned various components are contained has an opening, which is covered with the scanner cover 41, which is fitted with dust covers 39Y, 39M, 39C and 39K made of glass.

Since the image forming apparatus 100 and the optical scanning apparatus 3 are structured as described above, beams of laser light can be guided onto the peripheral surfaces of the photosensitive drum 1Y, 1M, 1C and 1K to accurately record an image. More concretely, as the rotational polygonal mirrors 33a and 33b are rotated, the optical scanning apparatus 3 is changed in the angle at which the beams LY, LM, LC and LK of laser light are deflected by the rotational polygonal mirrors 33a and 33b, causing thereby the spots of light formed by the focused beams LY, LM, LC and LK of laser light to move in the direction parallel to the rotational axis of the photosensitive drum 1 (primary scan). Further, as the photosensitive drums 1Y, 1M, 1C and 1K rotate, each of the spots of light formed by the beams LY, LM, LC and LK of laser light moves in the direction perpendicular to the axis of the photosensitive drum 1 (secondary scan). Consequently, four electrostatic latent images are formed on the photosensitive drums 1Y, 1M, 1C and 1K, one for one. (Attachment of optical scanning apparatus)

Figure 5:
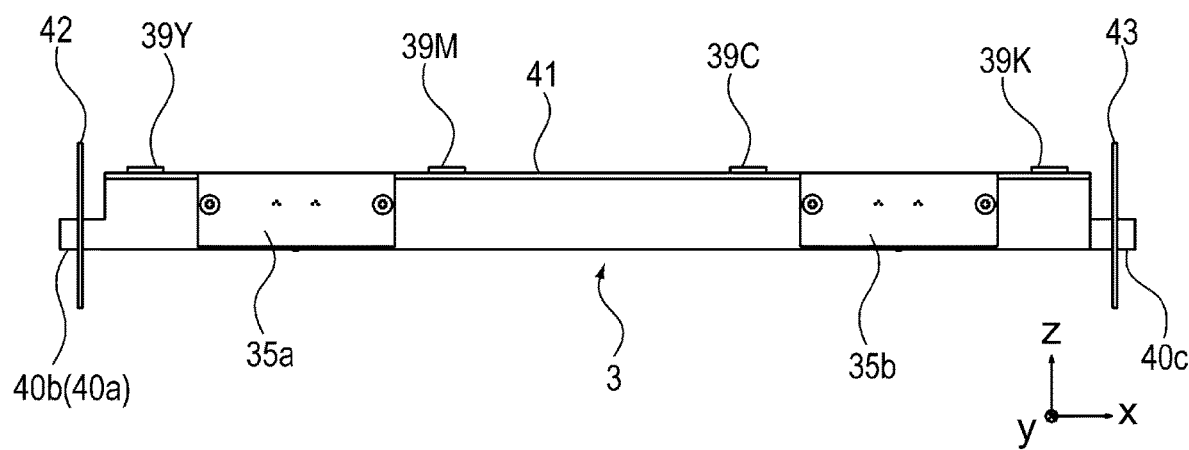
FIG. 5 is a side view of the optical scanning apparatus after the attachment of the optical scanning apparatus to the frame of the image forming apparatus.

Next, referring to FIGS. 4 and 5, the attachment of the optical scanning apparatus 3 to the frames 42 and 43 of the image forming apparatus 100 is described. FIGS. 4 and 5 are top and side views, respectively, of the optical scanning apparatus 3 attached to the frames 42 and 43 of the image forming apparatus 100.

As described above, the housing 40 of the optical scanning apparatus 3 has the three attachment appendages 40a, 40b and 40c, by which it is held to the frames 42 and 43 of the image forming apparatus 100. More specifically, the optical scanning apparatus 3 is held to (kept in contact with) the frames 42 and 43 by its attachment appendages 40a, 40b and 40c, by being pressed in the direction indicated by the arrow mark z, by elastic members. The structural arrangement for keeping the optical scanning apparatus 3 held to the frames 42 and 43 with the use of elastic members is described later in detail.

The reason why elastic members are used is as follows: If fastening members such as small screws are used instead of elastic members, as the fastening members are tightened, the portions of the housing 40, which are in contact with the screws, tend to move with the screws. Therefore, it is possible that the housing 40 will be deformed. The deformation of the housing 40 changes the optical scanning apparatus 3 in where on the peripheral surface of the photosensitive drum 1 the highly precisely adjusted beams of laser light is projected, and therefore, causes the image forming apparatus 100 to output unsatisfactory images, such as an image which suffers from color deviation.

For the same reason, the optical scanning apparatus 3 is structured so that it is held to the frames 42 and 43 of the image forming apparatus 100 by only three attachment appendages 40a, 40b and 40c of its housing 40. If the optical scanning apparatus 3 is structured so that it is held to the frames 42 and 43 by four or more attachment appendages of its housing 40, as the housing 40 is held to (placed in contact with) the frames 42 and 43, the gap which results, due to the tolerance for the components, between the plane which coincides with the three points of contact between the three attachment appendages of the housing 40 and the frames 42 and 43, and the portion of the frames, which corresponds to the fourth attachment appendage, is absorbed by the deformation of the housing 40.

In consideration of the fact that in recent years, an image forming apparatus is desired to be further improved in image quality, and also, further reduced in size, and also, the fact that some image reading apparatuses are provided with an image reading apparatus, which is placed on the main assembly of the image forming apparatus, it is desired to reduce an image forming apparatus in height. Reducing an image forming apparatus having an image reading portion, which makes up the top portion of the image forming apparatus, makes it necessary to reduce the optical scanning apparatus in height (thickness) as well.

As a means for reducing an optical scanning apparatus in height (thickness), it is effective to employ the structural arrangement for the optical scanning apparatus in this embodiment, which uses two scanner motors as deflecting means, in order not to stack optical components such as mirrors in the height direction of the apparatus.

However, further reducing the optical scanning apparatus 3 in thickness requires the housing 40 to be further reduced in thickness. Further reducing the housing 40 in thickness further reduces the housing 40 in rigidity. In this situation, if the optical scanning apparatus 3 is increased in the number of attachment appendages by which the housing 40 is fixed to the frames 42 and 43, in order to deal with vibrations, the housing 40 is deformed as described above, making it possible for the image forming apparatus 100 to output inferior images, such as those suffering from color deviation. (Positioning of Optical Scanning Apparatus and Scanner Motor)

Figure 6:
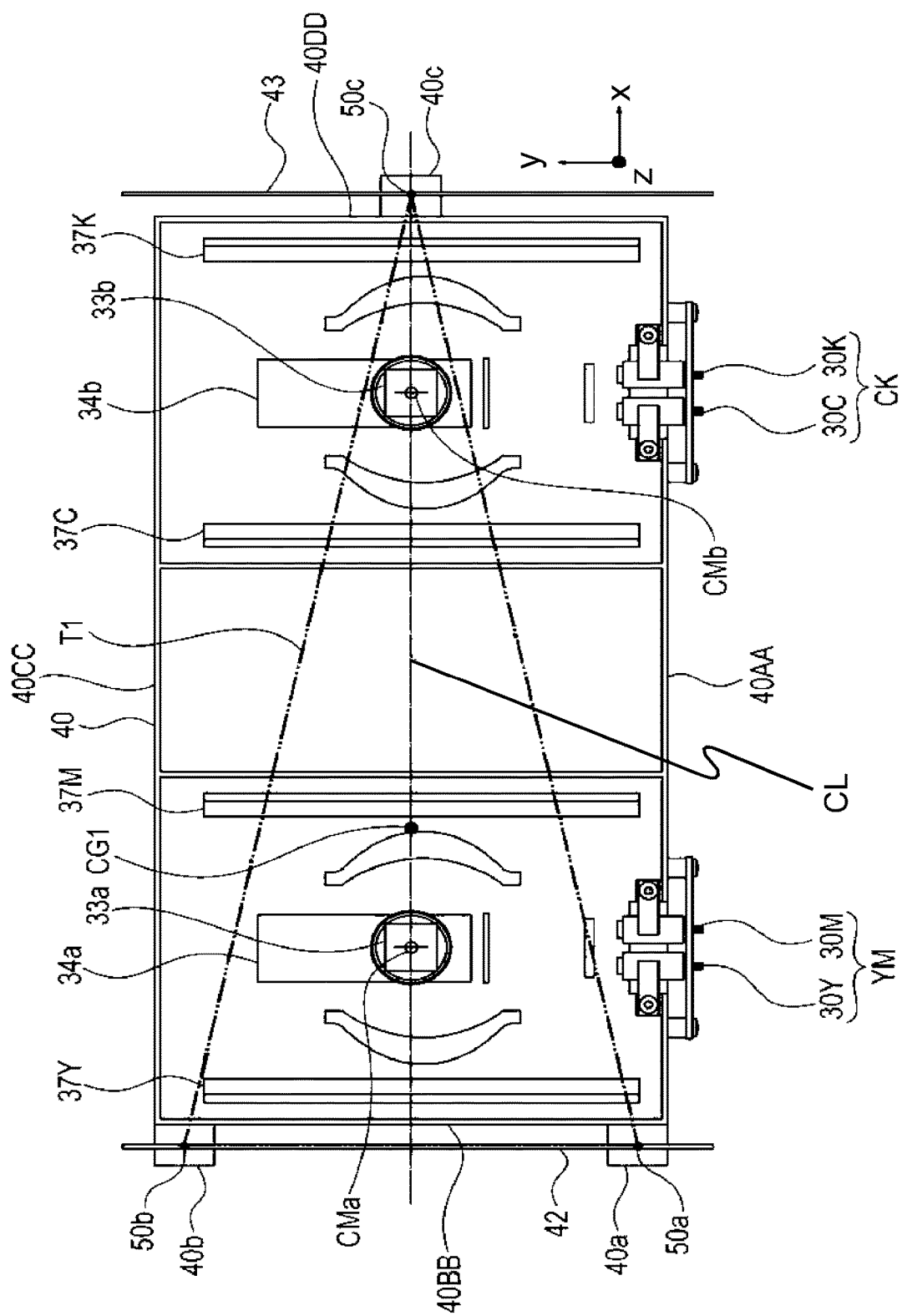
FIG. 6 is a top view of the optical scanning apparatus, which is for describing the locations of the attachment appendages of the housing of the optical scanning apparatus, and the positioning of the deflecting devices.

Thus, the optical scanning apparatus 3 in this embodiment is structured as follows. Referring to FIG. 6, the relationship between to what parts (40a, 40b and 40c) of the frames of the image forming apparatus 100 the optical scanning apparatus 3 is attached, and the positioning of the two scanner motors 34a and 34b, is described. FIG. 6 is a top view of the optical scanning apparatus 3, without its scanner cover 41, after the attachment of the optical scanning apparatus 3 to the frames 42 and 43 of the image forming apparatus 100.

As described previously, the optical scanning apparatus 3 is held to (kept in contact with) the frames 42 and 43 of the image forming apparatus 100 by the attachment appendages 40a, 40b and 40c of its housing 40, in such a manner that the attachment appendages 40a, 40b and 40c remain pressed in the direction indicated by the arrow mark z. The frames 42 and 43 of the image forming apparatus 100 support the optical scanning apparatus 3 by its portions which correspond in position to the three attachment appendages 40a, 40b and 40c of the housing 40.

In FIG. 6, the apexes of a triangular area T1 surrounded by a double-dot chain line coincide with the centers 50a, 50b and 50c of the attachment appendages 40a, 40b and 40c of the housing 40 of the optical scanning apparatus 3, in terms of the direction indicated by the arrow mark y. Among the three attachment appendages of the optical scanning apparatus 3, by which the optical scanning apparatus 3 is held to the frames of the image forming apparatus 100, two attachment appendages 40a and 40b are in contact with the frame 42, whereas the attachment appendage 40c is in contact with the frame 43, which is the opposite frame of the image forming apparatus 100 from the frame 42. That is, the optical scanning apparatus 3 is held to the frames 42 and 43 by remaining pressed toward the frames 42 and 43 by these three attachment appendages in the direction indicated by the arrow mark z. More specifically, the three attachment appendages of the optical scanning apparatus 3 are pressed upon the frames 42 and 43 by linear springs as the aforementioned elastic members, in the direction indicated by the arrow mark z, whereby the optical scanning apparatus 3 is held to the frames 42 and 43 of the image forming apparatus 100, in such a manner that it is allowed to slightly move relative to the frames 42 and 43. Next, this structural arrangement of the optical scanning apparatus 3 is described in detail.

Figure 7:
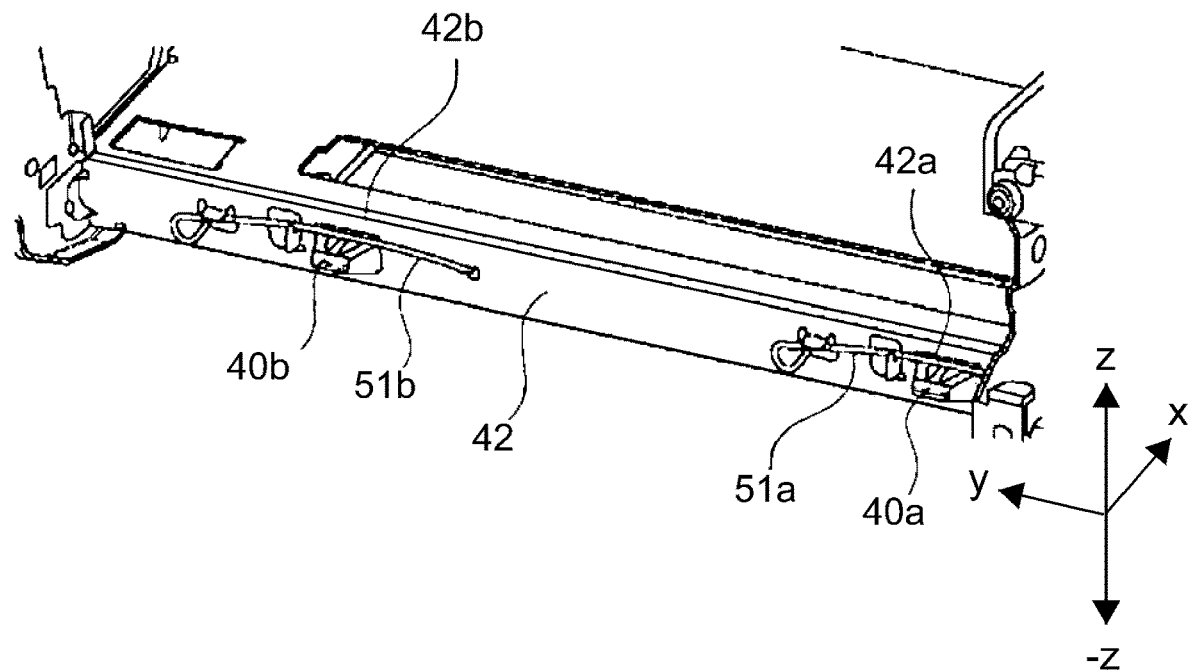
FIG. 7 is a perspective view of the optical scanning apparatus, which shows two attachment appendages of the housing of the optical scanning apparatus.

Referring to FIG. 7, the two attachment appendages 40a and 40b, with which the side wall 40BB of the housing 40 are provided, are inserted in the holes 42a and 42b, with which the frame 42 is provided. The frame 42 is provided with two linear springs 51a and 51b for keeping the attachment appendages 40a and 40b held to the frame 42 by their resiliency. More specifically, the free end portion of each of the two linear springs 51a and 51b attached to the frame 42 is pressed upon the frame 42 in a manner to press the attachment appendage 40a (40b) upon the frame 42 from above the attachment appendage 40a (40b) (opposite direction from direction indicated by arrow mark z) so that the free end is latched to the frame 42. Thus, the two attachment appendages 40a and 40b, with which one of the side walls of the housing 40 is provided, remain pressed upon (held to) the frames 42 by the two linear springs 51a and 51b anchored to the frame 42, whereby the housing 40 is held to the frame 42.

Figure 8:
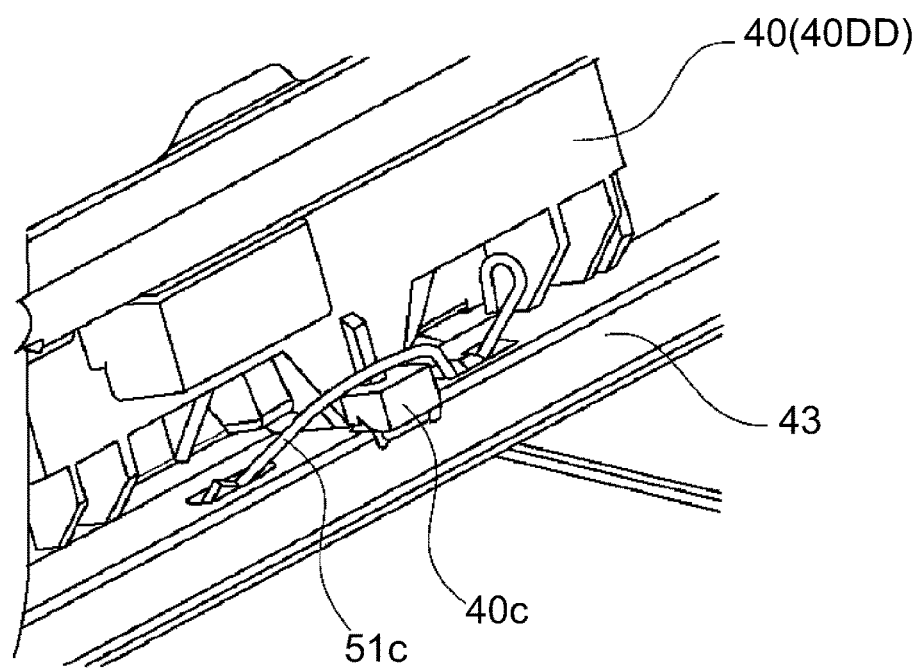
FIG. 8 is a perspective view of one of the attachment appendages of the housing of the optical scanning apparatus.
Figure 9:
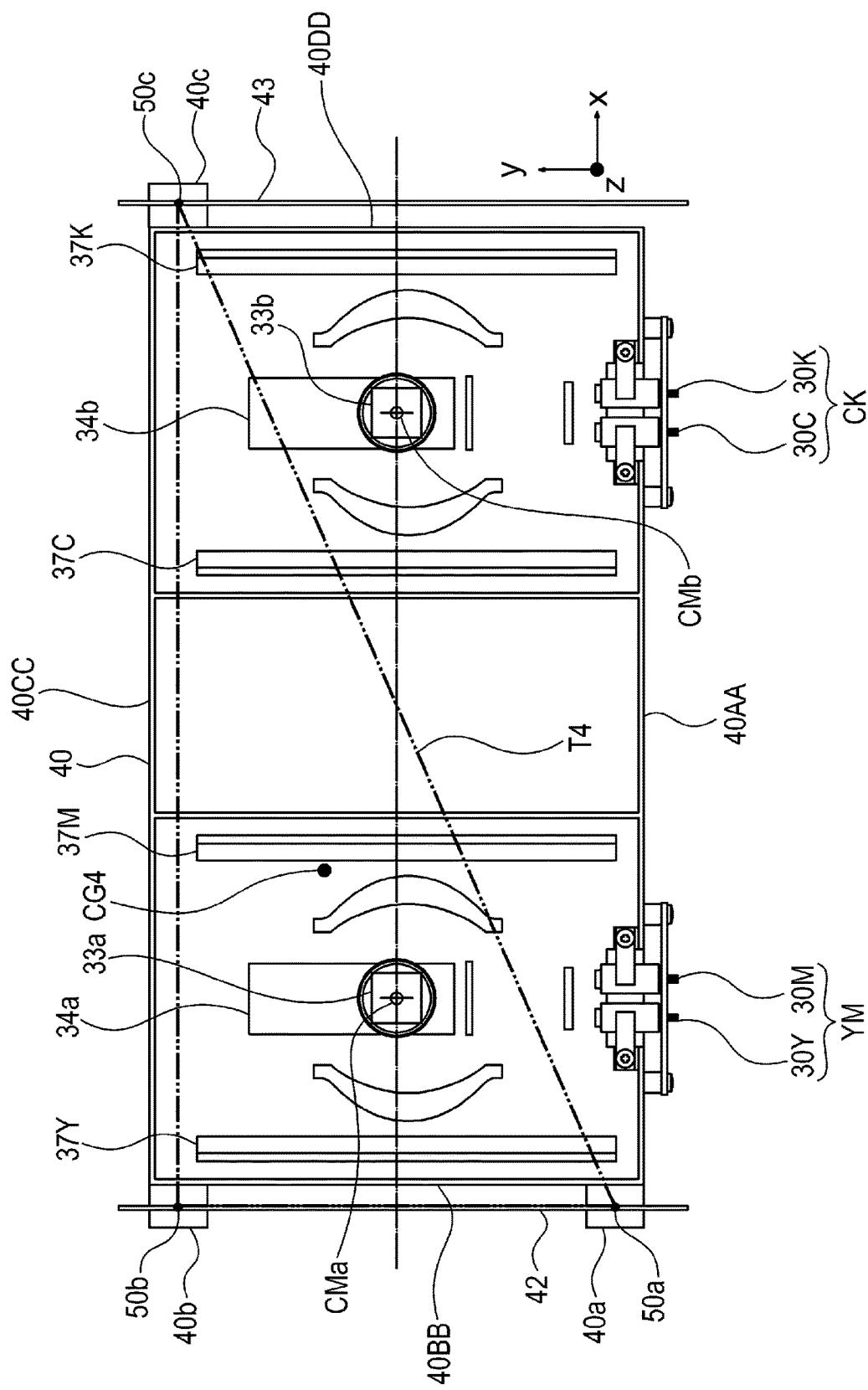
FIG. 9 is a top view of the comparative (conventional) optical scanning apparatus, which is for describing the location of the attachment appendages of the housing of the optical scanning apparatus, and positioning of the deflecting devices.

Referring to FIG. 8, the attachment appendage 40c, with which the other side wall 40DD of the housing 40 is provided, is held to the other frame 43 of the image forming apparatus 100, which opposes the frame 42. The frame 43 is provided with a linear spring 51c for pressing the attachment appendage 40c by its resiliency to hold the attachment appendage 40c to the frame 43. The free end portion of the linear spring 51c attached to the frame 43 is anchored to the frame 43 in a manner to press the attachment appendage 40c upon the frame 43. Therefore, the attachment appendage 40c, with which the other side wall of the housing 40 is provided, remains pressed upon the frame 43 by the linear spring 51 anchored to the other frame 43. Thus, the housing 40 is held to the frame 43 as well. This is how the housing 40 is held to the frames 42 and 43 of the image forming apparatus 100.

In this embodiment, a linear spring was used as the elastic member. However, this embodiment is not intended to limit the present invention in scope in terms of the choice of elastic member. For example, the elastic member may be a member other than a linear spring, as long as the elastic member can keep the attachment appendages, with which the housing 40 is provided, pressed upon (held to) the frame 42 or 43.

Further, the material for the attachment appendages may be a metallic substance, a plastic, or the like. Further, it may be a rubbery substance.

The scanner motors 34a and 34b are aligned in the direction indicated by the arrow mark x, which is the same as the direction in which the multiple (four) photosensitive drums are aligned in tandem. The shafts CMa and CMb of the scanner motors 34a and 34b are positioned on the inward side of the triangular area T1. Further, the center of gravity of the triangular area T1 is between the shaft CMa of the scanner motor 34a and the shaft CMb of the scanner motor 34b.

Further, the optical scanning apparatus 3 is structured so that the two scanner motors 34a and 34b, which are the sources of vibrations, are positioned within the triangular area T1, the apexes of which coincide with the centers of the three attachment appendages 40a, 40b and 40c of the housing 40, and also, so that the center CG1 of gravity of the triangular area T1 falls between the two scanner motors 34a and 34b. Therefore, the optical scanning apparatus 3 is minimized in the amount of vibration of its housing 40, and therefore, is minimized in the amount by which the beams of laser light emitted by the light sources is made to miss the preset points, by the vibrations of the scanner motors 34a and 34b.

At this time, examples of comparative optical scanning apparatus are described. In the case of the example of comparative optical scanning apparatus shown in FIG. 9, it is structured so that the scanner motor 34b, which is one of the two scanner motors 34a and 34b, which are the primary sources of vibrations, is on the outward side of the triangular area T4 surrounded by the double-dot lines which connect the centers 50a, 50b and 50c of the attachment appendages 40a, 40b and 40c. In this case, the center of gravity of CG4 of the triangular area T4 is between the shaft CMa of the scanner motor 34a and the shaft CMb of the scanner motor 34b. However, the scanner motor 34b is outside the triangular area T4. Therefore, it is possible that the vibrations from the scanner motor 34b, which is outside the triangular area T4 will causes the beams of laser light to miss the preset points.

In comparison, referring to FIG. 6, in the case of this embodiment, the two scanner motors 34a and 34b which are the sources of vibrations, are on the inward side of the triangular area T1 surrounded by the lines which connect the centers 50a, 50b and 50c of the three attachment appendages 40a, 40b and 40c of the housing 40, respectively. Moreover, the center of gravity CG1 of the triangular area T1 is between the two scanner motors 34a and 34b. Therefore, it is substantially smaller in the amount of vibrations of the housing 40 than the comparative optical scanning apparatus. Therefore, it is substantially smaller in the amount by which the beams of laser light are made to deviate from the preset points, by the vibrations from the scanner motors than the comparative one.

As described above, an optical scanning apparatus can be reduced in height by providing the apparatus with two scanner motors 34a and 34b for deflecting the beams of light projected from multiple light sources, and structuring the apparatus so that the two scanner motors 34a and 34b are disposed side by side. Further, even if the optical scanning apparatus is reduced in height, the three attachment appendages 40a, 40b and 40c of the housing 40 are supported by the frame 42 and 43 of the image forming apparatus 100. Therefore, the housing 40 is prevented from deforming. Moreover, the optical scanning apparatus 3 is structured so that the two scanner motors 34a and 34b are positioned on the inward side of the triangular area T1 surrounded by the lines which connect the centers of the attachment appendages 40a, 40b and 40c, and also, the center of gravity CG1 of the triangular area T1 falls between the two scanner motors 34a and 34b. Therefore, the optical scanning apparatus 3 in this embodiment is substantially less in the overall height, less in the amount of housing deformation, and less in the amount of housing vibrations, and less in the amount by which the scanning beams of light miss the preset points (targets), than any conventional optical scanning apparatus.

Other Embodiments

Figure 10:
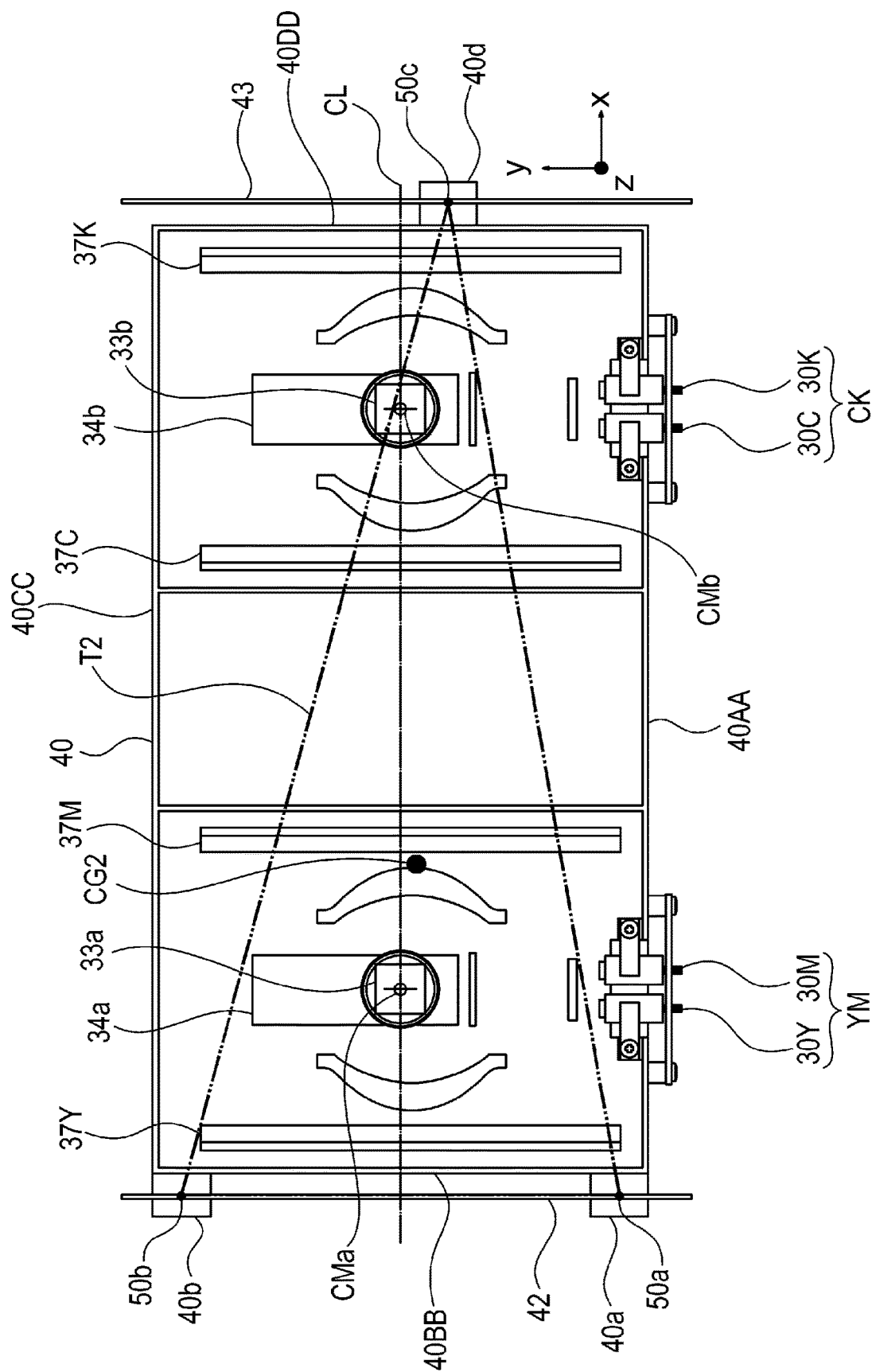
FIG. 10 is a top view of the optical scanning apparatus in another embodiment of the present invention, which is for describing the location of the attachment appendages of the housing of the optical scanning apparatus, and positioning of the deflecting devices.

FIG. 10 shows the optical scanning apparatus in another embodiment of the present invention, which is more effective to reduce an image forming apparatus in the amount of image defects attributable to vibrations than the one in the preceding embodiment. The components, and portions thereof, of the optical scanning apparatus in this embodiment, which are the same in function as the counterparts in the preceding embodiment are given the same referential codes as those given to the counterparts, and are not described. The structural feature of the optical scanning apparatus in this embodiment, which characterizes this embodiment, is the positioning of the attachment appendages 40a, 40b and 40c of the housing 40 supported by the frames 42 and 43 of the image forming apparatus.

Referring to FIG. 10, as the housing 40 is divided into two sections by a straight line CL which connects the centers of the two shafts CMa and CMb, the attachment appendages 40a, 40b and 40c are positioned as follows. That is, the two attachment appendages 40a and 40c of the three attachment appendages are in the area which the semiconductor lasers 30Y, 30M, 30C and 30K, which are the light sources, are present.

Also in this case, the shafts CMa and CMb of the scanner motors 34a and 34b, respectively, are positioned in the triangular area T2 surrounded by the double-dot chain line, and the center of gravity CG2 of the triangular area T2 also is between the two shafts CMa and CMb in terms of the direction (parallel to direction indicated by arrow x) parallel to the direction in which the multiple (four) photosensitive drums are aligned in tandem. Moreover, the two attachment appendages 40a and 40c of the three attachment appendages 40a, 40b and 40c are positioned in the area in which the multiple light sources are. Therefore, it is possible to prevent the vibrations of the light source, which the image forming apparatus is susceptible as described above.

By the way, the triangular area T2 surrounded by the double-dot chain line is the same area as the triangular area T1 (FIG. 6) in the preceding embodiment, which is surrounded by the three sides of the triangle, the apexes of which coincide with the centers 50a, 50b and 50c of the attachment appendages 40a, 40b and 40c, respectively, of the housing 40. The centers 50a, 50b and 50c of the attachment appendages 40a, 40b and 40c are in terms of the direction (indicated by arrow mark y), at the plane which coincides with the points of contact between the attachment appendages 40a, 40b and 40c, and the frames 42 and 43 of the image forming apparatus 100.

Further, in the embodiment 1 described above, the center of gravity CG1 of the triangular area T1, the apexes of which coincide with the centers of the three attachment appendages 40a, 40b and 40c of the housing 40, was on the straight line CL which connects the centers of the two shafts CMa and CMb. This embodiment, however, is not intended to limit the present invention in scope in terms of the location of the center of gravity CG1. That is, it is not mandatory that the center of gravity CG2 of the triangular area T2, the apexes of which coincide with the centers of the three attachment appendages 40a, 40b and 40c, respectively, of the housing 40, is on the straight line CL which connects the centers of the shafts CMa and CMb, as shown in FIG. 10.

Figure 11:
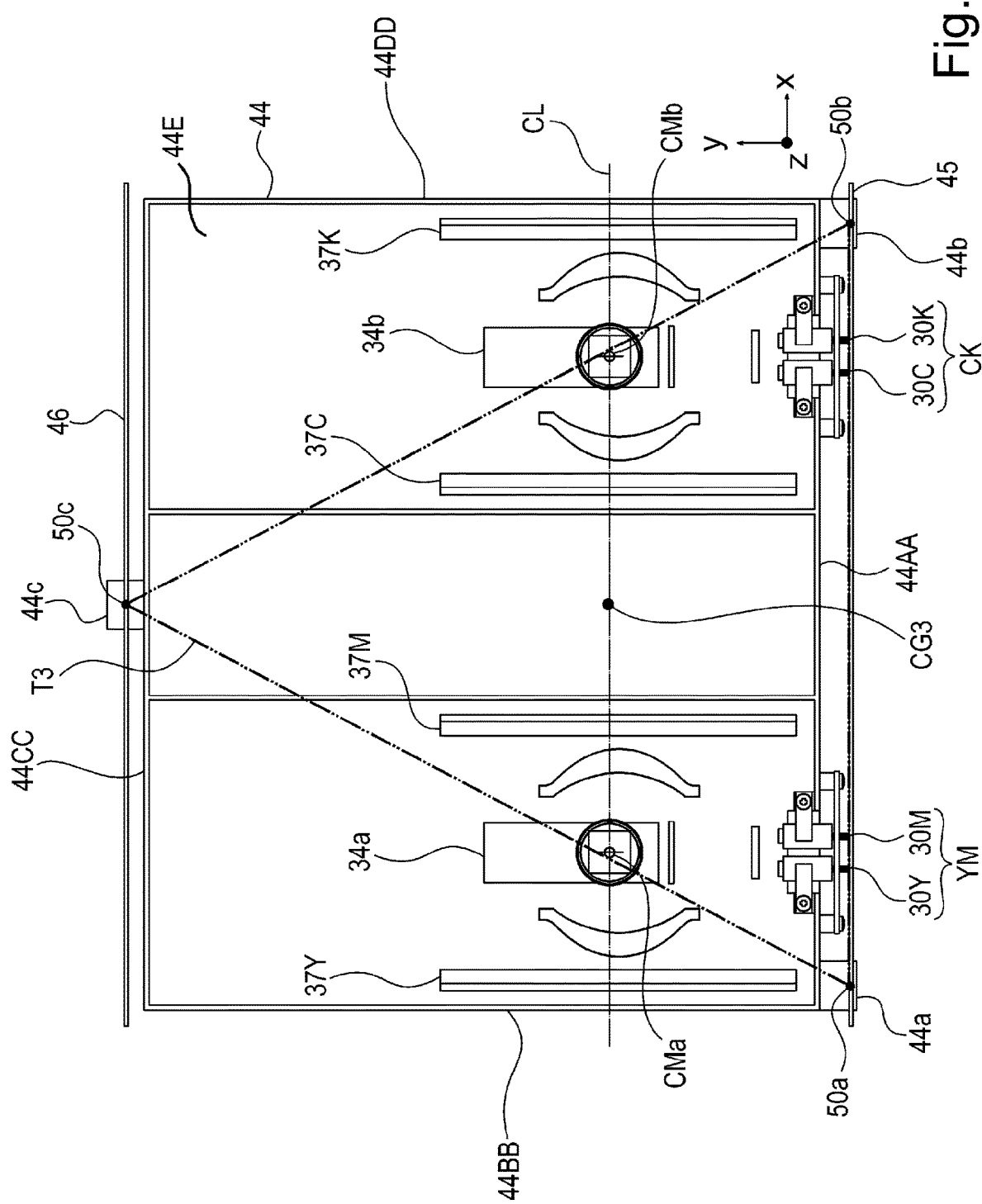
FIG. 11 is a top view of the optical scanning apparatus in another embodiment of the present invention, which is for describing the location of the attachment appendages of the housing of the optical scanning apparatus, and positioning of the deflecting devices.

Shown in FIG. 11 is another embodiment of the present invention, in which the center of gravity of the triangular area, the apexes of which coincide with the centers of the three attachment appendages 40a, 40b and 40c, respectively, of the housing 40 is not on the straight line which connects the centers of the two shafts CMa and CMb. The housing 44 shown in FIG. 11 has three attachment appendages 44a, 44b and 44c, by which the housing 44 is held to the frames 45 and 46 of the image forming apparatus 100. The housing 44 has a bottom wall 44E, and four side walls 44AA, 44BB, 44CC and 44DD, which surround the bottom wall 44E, like in the case of the housing 40 in the preceding embodiment described above, having the bottom wall, and four side walls. The opening of the housing 44, which opposes the bottom wall 44E, is covered with a scanner cover (unshown).

In the embodiments described above, the three attachment appendages by which the housing is held to the frames of the image forming apparatus, are attached to the housing of the optical scanning apparatus. That is, the opposing two side walls, to which the two light sources are not attached, are provided with through holes. However, the preceding embodiments are not intended to limit the present invention in scope in terms of the structure of the optical scanning apparatus. That is, the preceding embodiments are not intended to limit the structure of the optical scanning apparatus to such one that one of the side wall of the housing is provided with two attachment appendages, and the opposite side wall of the housing is provide with one attachment appendage.

That is, the optical scanning apparatus may be structured so that the side wall 44AA of the housing 44, to which two light sources is attached, and the opposite wall 44CC of the housing 44 from the side wall 44AA are provided with the three attachment appendages, as shown in FIG. 11.

Referring to FIG. 11, of the three attachment appendages 44a, 44b and 44c of the housing 44, the side wall 44AA of the housing 44, which are holding the semiconductor lasers 30Y, 30M, 30C and 30K, which are light sources, is provided with two attachment appendages 44a and 44b. Further, the opposite side wall 44CC of the housing 44 from the side wall 44AA which is provided with the attachment appendage 44c.

The side wall 44AA of the housing 44, which has the two attachment appendages 44a and 44b is on one side of the straight line (single-dot chain line in FIG. 11) which connects the centers of the shafts CMa and CMb. Further, the other side wall 44CC of the housing 44, which has the attachment appendage 44c is on the opposite side of the straight line CL (single-dot chain line in FIG. 11). That is, provided that the housing 44 is divided into two sections by the straight line CL, the two attachment appendages 44a and 44b, with which the area having the two light sources is provided, are parts of the side wall 44AA of the housing 44, which holds the two light sources. Further, the attachment appendage 44c which belongs to the area having no light source, is a part of the side wall 44CC, or the opposite side wall of the housing 44 from the side wall 44AA.

Also in this case, the shafts CMa and CMb of the scanner motors are on the inward side of the center of gravity CG3 of the triangular area T3, and the center of gravity CG3 of the triangular area T3 is between the two shafts CMa and CMb in terms of the direction (indicated by arrow mark x) parallel to the direction in which the four photosensitive drums are aligned in tandem. Moreover, of the three attachment appendages 44a, 44b and 44c, the two attachment appendages 44a and 44b are positioned in the area in which the two light sources are present. Therefore, the vibrations from the side having light sources, to which the image forming apparatus 100 is highly susceptible with regard to the formation of inferior images, can be suppressed. Therefore, it is possible to better prevent the image forming apparatus 100 from outputting such images that suffer from the defects attributable to the vibrations attributable to the light source side of the housing.

By the way, the triangular area T3 outlined by the double-dot chain line is also such an area that is surrounded by the three sides of the triangle, the apexes of which coincide with the centers of the attachment appendages 44a, 44b and 44c of the housing 44 of the optical scanning apparatus 3. The centers 50a, 50b and 50c (apexes) of the attachment appendages 44a, 44b and 44 are such centers of attachment appendages 44a, 44b and 44c, in terms of the direction parallel to both the directions indicated by the arrow mark x, and that indicated by the arrow mark y, as seen from the direction indicated by the arrow mark z, that is, the centers of the areas of contact between the attachment appendages 44a, 44b and 44c, and the frames 45 and 46, at the plane which coincides with the centers 50a, 50b and 50b (apexes).

In the preceding embodiments, the image forming apparatus was a printer. However, these embodiments are not intended to limit the present invention in scope in terms of the choices of an image forming apparatus to which the present invention is applicable. That is, the present invention is also compatible with other image forming apparatuses than the image forming apparatuses in the preceding embodiments. For example, the present invention is also compatible with a copying machine, a facsimileing machine, and the like. Further, in the preceding embodiments, the image forming apparatuses employed an intermediary transferring member, sequentially transferred multiple (four) toner images, different in color, in layers onto the intermediary transferring member, and transferred together the multiple toner images on the intermediary transferring member, onto a sheet of recording medium. However, the preceding embodiments are not intended to limit the present invention in scope in terms of the choices of image forming apparatus. For example, it is also compatible with an image forming apparatus which employs a recording medium bearing member, and sequentially transfers multiple (four) toner images, different in color, in layers onto the sheet of recording medium on the recording medium bearing member. That is, effects similar to those obtainable by the optical scanning apparatuses in the preceding embodiment are also obtainable by applying the present invention to an optical scanning apparatus which is employed by any electrophotographic image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-098663 filed on May 23, 2018, which is hereby incorporated by reference herein in its entirety.

What is claimed is:

1. An optical scanning apparatus comprising:
a first light source configured to emit a beam modulated in accordance with image information;
a first deflection unit configured to deflect the beam emitted from said first light source, said first deflection unit including a first rotatable polygonal mirror configured to reflect the beam emitted from said first light source;
a first scanning lens through which the beam reflected by said first rotatable polygonal mirror transmits;
a second light source configured to emit a beam modulated in accordance with image information;
a second deflection unit configured to deflect the beam emitted from said second light source, said second deflection unit includes a second rotatable polygonal mirror configured to reflect the beam emitted from said second light source;
a second scanning lens through which the beam reflected by said second rotatable polygonal mirror transmits; and
a housing accommodating said first deflection unit, said second deflection unit, said first scanning lens and said second scanning lens, said housing includes only three fixed portions fixed to a fixing portion configured to fix said optical scanning apparatus;
wherein said first rotatable polygonal mirror and said second rotatable polygonal mirror are disposed such that a rotational axis of said first rotatable polygonal mirror and a rotational axis of said second rotatable polygonal mirror are in a triangular area defined by lines connecting the three fixed portions, as viewed in a rotation axial direction of said first rotatable polygonal mirror; and
wherein each of the three fixed portions is pressed to the fixing portion by an elastic member.

2. An apparatus according to claim 1, wherein said first rotatable polygonal mirror and said second rotatable polygonal mirror are disposed such that a gravity center of the triangular shape is in an area between a rotational axis of said first rotatable polygonal mirror and a rotational axis of said second rotatable polygonal mirror, is viewed in a direction of the rotational axis on said first rotatable polygonal mirror.

3. An apparatus according to claim 2, wherein two of the three fixed portions are disposed on one of plural side surfaces of said housing, said one of the plural side surfaces being across a line connecting the rotational axis of said first rotatable polygonal mirror and the rotational axis of said second rotatable polygonal mirror.

4. An apparatus according to claim 2, wherein two of the three fixed portions are disposed on one of plural side surfaces of said housing, said one of the plural side surfaces being across a line perpendicular to a line connecting the rotational axis of said first rotatable polygonal mirror and the rotational axis of said second rotatable polygonal mirror, and the other one fixed portion is disposed on a side opposite from said one of the plural side surfaces.

5. An apparatus according to claim 2, wherein two of the three fixed portions is in one of areas provided by dividing said housing by a line connecting the two rotational axes, said one of the areas include said first and second light sources.

6. An apparatus according to claim 2, wherein a direction connecting said first light source and said second light source substantially parallel with the direction connecting the rotational axis of said first rotatable polygonal mirror and the rotational axis of said second rotatable polygonal mirror.

7. An apparatus according to claim 2, further comprising a third light source configured to emit a beam modulated with image information, and a fourth light source configured to emit a beam modulated with image information, wherein the beam emitted from said third light source is reflected by said first rotatable polygonal mirror in a direction opposite from a direction in which the beam emitted from said first light source is reflected by said first rotatable polygonal mirror, and wherein the beam emitted from said fourth light source is reflected by said second rotatable polygonal mirror in a direction opposite from a direction in which the beam emitted from said second light source is reflected by said second rotatable polygonal mirror.

8. An apparatus according to claim 1, wherein said elastic member is a linear spring.

9. An image forming apparatus for forming a toner image on a recording material, comprising:
   a first photosensitive member;
   a second photosensitive member;
   an optical scanning unit configured to scan said first photosensitive member and said second photosensitive member with beams modulated in accordance with image information, said optical scanning unit includes:
      a first light source configured to emit the beam modulated in accordance with the image information;
      a first deflection unit configured to deflect the beam emitted from said first light source, said first deflection unit including a first rotatable polygonal mirror configured to reflect the beam emitted from said first light source;
      a first scanning lens through which the beam reflected by said first rotatable polygonal mirror transmits;
      a second light source configured to emit the beam modulated in accordance with image information;
      a second deflection unit configured to deflect the beam emitted from said second light source, said second deflection unit includes a second rotatable polygonal mirror configured to reflect the beam emitted from said second light source;
      a second scanning lens through which the beam reflected by said second rotatable polygonal mirror transmits; and
   a housing accommodating said first deflection unit, said second deflection unit, said first scanning lens and said second scanning lens, said housing includes only three fixed portions fixed to a fixing portion configured to fix said optical scanning unit;
   wherein said first rotatable polygonal mirror and said second rotatable polygonal mirror are disposed such that a rotational axis of said first rotatable polygonal mirror and a rotational axis of said second rotatable polygonal mirror are in a triangular area defined by lines connecting the three fixed portions, as viewed in a rotation axial direction of said first rotatable polygonal mirror;
   three elastic members configured to press the three fixed portions; and
   a frame configured to fix said optical scanning unit by said elastic member at each of the three fixed portions.

10. An apparatus according to claim 9, wherein said first rotatable polygonal mirror and said second rotatable polygonal mirror are disposed such that a gravity center of the triangular shape is in an area between a rotational axis of said first rotatable polygonal mirror and a rotational axis of said second rotatable polygonal mirror, is viewed in a direction of the rotational axis on said first rotatable polygonal mirror.

11. An apparatus according to claim 10, wherein two of the three fixed portions are disposed on one of plural side surfaces of said housing, said one of the plural side surfaces being across a line connecting the rotational axis of said first rotatable polygonal mirror and the rotational axis of said second rotatable polygonal mirror.

12. An apparatus according to claim 10, wherein two of the three fixed portions are disposed on one of plural side surfaces of said housing, said one of the plural side surfaces being across a line perpendicular to a line connecting the rotational axis of said first rotatable polygonal mirror and the rotational axis of said second rotatable polygonal mirror, and the other one fixed portion is disposed on a side opposite from said one of the plural side surfaces.

13. An apparatus according to claim 10, wherein two of the three fixed portions is in one of areas provided by dividing said housing by a line connecting the two rotational axes, said one of the areas include said first and second light sources.

14. An apparatus according to claim 10, wherein a direction connecting said first light source and said second light source substantially parallel with the direction connecting the rotational axis of said first rotatable polygonal mirror and the rotational axis of said second rotatable polygonal mirror.

15. An apparatus according to claim 10, further comprising a third light source configured to emit a beam modulated with image information, and a fourth light source configured to emit a beam modulated with image information, wherein the beam emitted from said third light source is reflected by said first rotatable polygonal mirror in a direction opposite from a direction in which the beam emitted from said first light source is reflected by said first rotatable polygonal mirror, and wherein the beam emitted from said fourth light source is reflected by said second rotatable polygonal mirror in a direction opposite from a direction in which the beam emitted from said second light source is reflected by said second rotatable polygonal mirror.

16. An apparatus according to claim 9, wherein said elastic member is a linear spring.

* * * * *